United States Patent [19]

Threlkel et al.

[11] Patent Number: 4,569,219
[45] Date of Patent: Feb. 11, 1986

[54] CABLE BENDING DEVICE

[76] Inventors: Charles O. Threlkel, 18285 Old Mehama Rd., Stayton, Oreg. 97383; Delbert E. Neal, P.O. Box 553, Gates, Oreg. 97346

[21] Appl. No.: 613,591

[22] Filed: May 23, 1984

[51] Int. Cl.[4] .............................................. B21D 5/01
[52] U.S. Cl. ....................................... 72/381; 72/389; 72/390
[58] Field of Search ................. 72/381, 386, 389, 390; 29/256, 266, 283.5; 140/105, 106; 254/134.3 CL

[56] References Cited

U.S. PATENT DOCUMENTS

| | | | |
|---|---|---|---|
| 1,764,840 | 6/1930 | Kicherer et al. | 72/390 |
| 2,740,435 | 4/1956 | Pritts | 140/147 |
| 3,415,104 | 12/1968 | Conklin | 72/390 |
| 3,691,815 | 9/1972 | Deacon | 72/458 |
| 3,824,835 | 7/1974 | Jackson | 72/389 |
| 3,855,838 | 12/1974 | Jackson | 72/458 |
| 3,875,786 | 4/1975 | Wright | 72/387 |

FOREIGN PATENT DOCUMENTS 2223461  9/1978  Fed. Rep. of Germany ........ 72/389
0070926  4/1983  Japan ..................................... 72/389

Primary Examiner—Francis S. Husar
Assistant Examiner—Robert Showalter
Attorney, Agent, or Firm—Harvey B. Jacobson

[57] ABSTRACT

A cable bending device specifically adapted to form an expansion bend or loop in a cable television wire or cable to enable the cable television cable to expand and contract during temperature changes without undue tension, stress or buckling of the cable television cable. The bending device includes an elongated, generally vertical plate supported from the lasher cable at a point adjacent a supporting pole or the like with the plate including a pair of end shoes engaging the undersurface of the cable television cable and a center shoe engaging the top surface of the cable television cable. The center shoe can be adjusted vertically by a handcrank and screw threaded shaft arrangement and the two end shoes can be adjusted and locked by eccentric locking mechanism. The cable bending device is releasably supported from the lasher cable to enable easy assembly and disassembly of the bending device with respect to the supporting lasher cable and the cable television cable in which the shallow bend or loop is to be formed.

18 Claims, 12 Drawing Figures

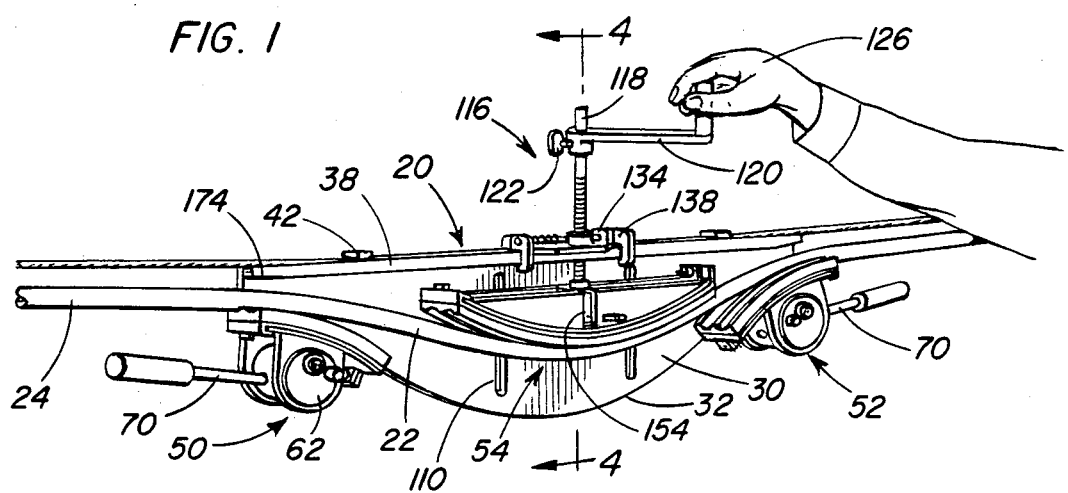
FIG. 1
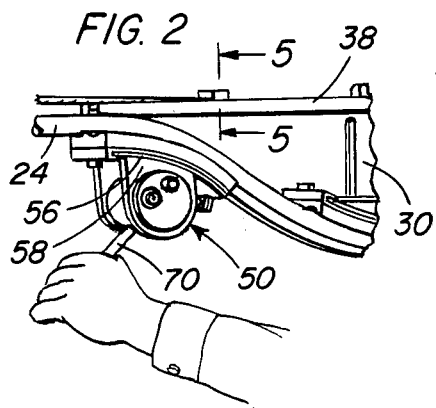
FIG. 2
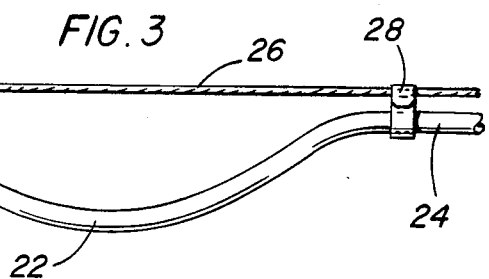
FIG. 3
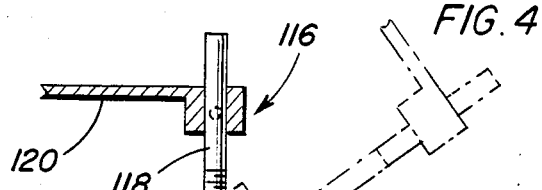
FIG. 4
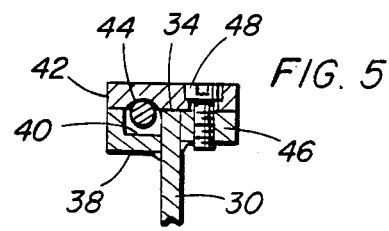
FIG. 5
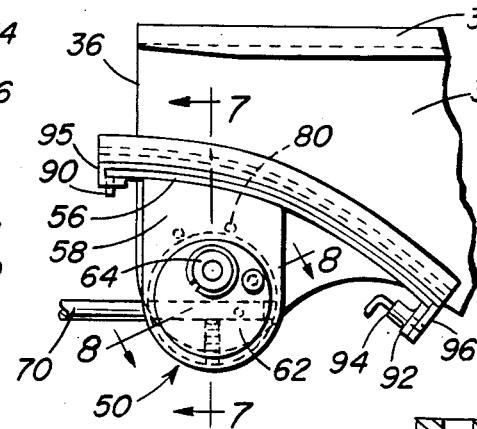
FIG. 6
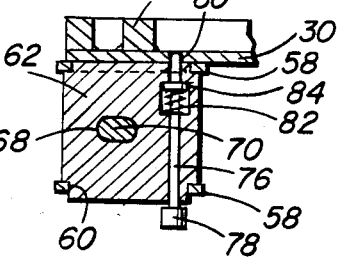
FIG. 7
FIG. 8

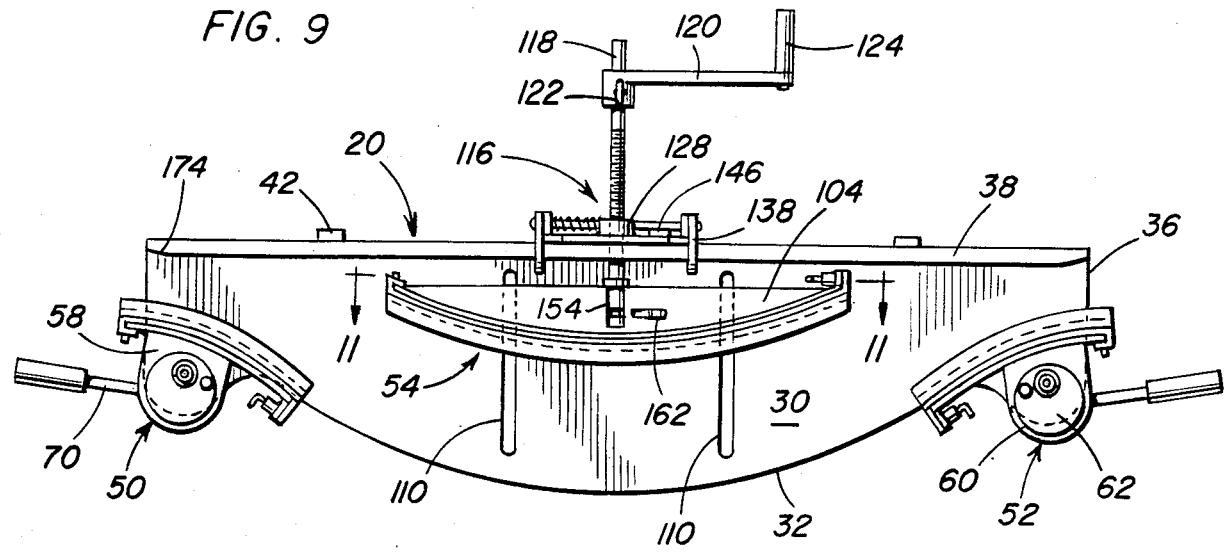
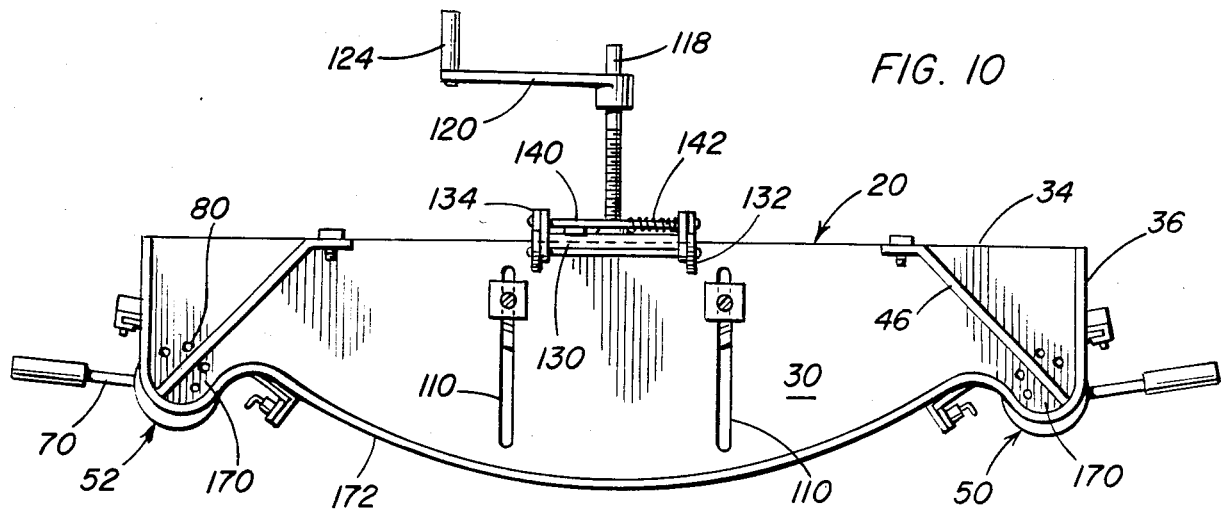
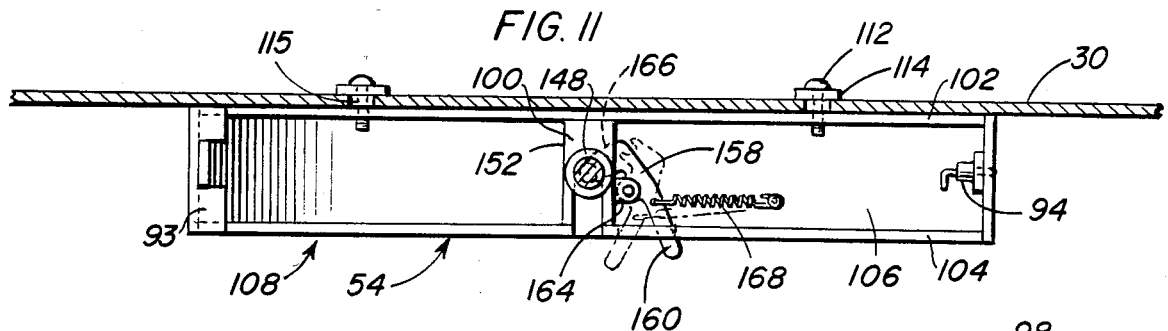
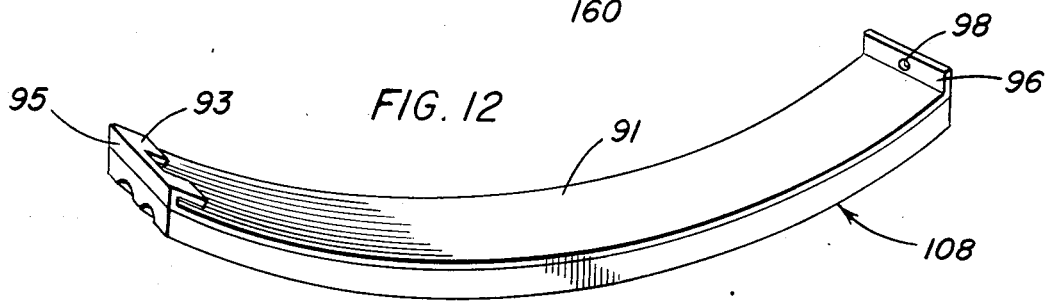

CABLE BENDING DEVICE

BACKGROUND OF THE INVENTION

1. Field of the Invention

The present invention generally relates to a cable bending device and more particularly to a device for forming a shallow bend or loop in a cable television cable to enable the cable to expand or contract in length due to change in temperature. The device includes an apparatus providing longitudinally spaced, curved shoes or pads engaging the cable television cable on one side thereof and an intermediate curved shoe or pad engaging the cable television cable on the opposite side thereof between the two end shoes with the intermediate shoe being movable between the end shoes to effectively deform the cable television cable in order to form a bend or loop therein with the device being easily attached to and removed from a supporting lasher cable to which the cable television cable is supportingly connected.

2. Description of the Prior Art

The wire or cable for cable television and similar cables such as those used in communications and the like are strung from vertically disposed poles and supported from a supporting cable usually referred to as a lasher cable that is actually attached to the poles. The wire or cable used for cable television and other similar uses is relatively solid and will expand and contract during temperature changes, such as occurs from daytime hours to nighttime hours. In order to accommodate such expansion and contraction, cable television wires or cables are usually provided with a shallow bend or loop in the cable at each pole to allow for such contraction and expansion. Heretofore, the formation of the bend or loop has been manually accomplished by using a wooden form having an arcuate surface with the installer required to exert considerable effort and expend considerable time in forming the loop by deforming the cable around the curved surface of the wooden form. Prior U.S. Pat. No. 3,824,835 discloses a device for forming a bend or loop in a cable utilizing a pair of longitudinally spaced members which engage a cable on one side thereof and an intermediate member engaging the cable on the opposite side thereof with relative lateral movement between the members being effective to form a bend or loop in the cable. In addition, the following U.S. patents relate to this subject matter.

| | |
|---|---|
| 2,740,435 | Apr. 3, 1956 |
| 3,691,815 | Sept. 19, 1977 |
| 3,855,838 | Dec. 24, 1974 |
| 3,875,786 | Apr. 8, 1975 |

Devices previously provided for this purposes are relatively cumbersome and awkward to use and require the use of considerable time and effort on the part of the installer.

SUMMARY OF THE INVENTION

An object of the present invention is to provide a cable bending device for forming a shallow bend or partial loop in a cable television wire or cable to enable expansion and contraction thereof due to temperature changes which includes an apparatus having a pair of longitudinally spaced members which engage the cable at longitudinally spaced points and an intermediate movable member engaging the cable on the opposite side thereof from the two longitudinally spaced points and a mechanical device for moving the intermediate member laterally to deform the portion of the cable between the longitudinally spaced members into a bend or partial loop.

Another object of the invention is to provide a cable bending device in accordance with the preceding object which includes a structure enabling it to be quickly and easily attached to a supporting lasher cable to enable the formation of a bend or loop in an efficient and time conserving manner by utilizing less manual force and manipulation.

A further object of the invention is to provide a cable bending device in accordance with the preceding objects in which the apparatus includes a generally vertically oriented support plate with lasher cable guides and latches at the upper edge thereof, a pair of longitudinally spaced curved shoes and an intermediate curved shoe mounted on the plate together with manually manipulatable structures for adjusting the shoes and locking them in position with the curvature of the shoes being such to form a shallow bend or loop without any sharp corners being formed in the cable television cable or wire.

Still another object of the invention is to provide a cable bending device in accordance with the preceding objects which is relatively inexpensive to manufacture, dependable and long lasting and effective for forming a plurality of loops in a cable television cable and connecting the cable to the lasher cable.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the cable bending device of the present invention illustrating its position when the initial step in the cable deformation is undertaken.

FIG. 2 is a fragmental perspective view of one end of the device illustrating a final step in the deformation of the cable.

FIG. 3 is a side elevational view illustrating the lasher cable and cable television cable with the bend or loop formed therein.

FIG. 4 is a transverse sectional view, on an enlarged scale, taken substantially upon a plane passing along section line 4—4 on FIG. 1 illustrating the structure of the intermediate shoe and the manner in which it is adjusted and the structure for connecting the device to the lasher cable.

FIG. 5 is a fragmental sectional view, on an enlarged scale, taken substantially upon a plane passing along section line 5—5 on FIG. 2 illustrating the structure for securing the cable bending device to the lasher cable.

FIG. 6 is a fragmental side elevational view of one end of the device illustrating the structure of the end shoe and the eccentric locking mechanism therefor.

FIG. 7 is a sectional view taken substantially upon a plane passing along section line 7—7 on FIG. 6 illustrating further structural details of the end shoe and eccentric locking mechanism.

FIG. 8 is a sectional view taken substantially upon a plane passing along section line 8—8 on FIG. 6 illustrat- FIG. 9 is a side elevational view of the cable bending device prior to its being associated with the lasher cable and cable television cable.

FIG. 10 is a side elevational view opposite to that of FIG. 9.

FIG. 11 is a longitudinal sectional view taken substantially upon a plane passing along section line 11—11 on FIG. 9 illustrating the intermediate shoe.

FIG. 12 is a perspective view of one of the shoe pads.

DESCRIPTION OF THE PREFERRED EMBODIMENT

The cable bending device of the present invention is generally designated by reference numeral 20 and is used to form a shallow bend or loop 22 in a cable television wire or cable 24 which is suspended in closely spaced relation below a supporting or lasher cable 26 by supporting members 28 in a conventional and well known manner. The bend or loop 22 is formed in the cable 24 adjacent each pole to accommodate longitudinal expansion and contraction of the cable 24 due to temperature changes. The cable bending device 20 of the present invention is attached to and suspended from the lasher cable 26 and receives the cable television cable 24 therein and forms the bend or loop 22 therein with the supporting clips or brackets 28 then being connected between the cable 24 and cable 26 in a conventional and well known manner.

The cable bending device 20 includes a substantially flat, elongated, vertically disposed plate 30 which has a curved lower edge 32 and a substantially straight upper edge at 34 and substantially straight end edges 36. On one side of the plate, hereinafter referred to as the front side of the plate, an elongated, continuous right angular member 38 is welded adjacent the upper edge which cooperates with the upper edge portion of the plate 30 to form a longitudinal channel 40 to receive the lasher cable 26 throughout the length of the plate 30. A pair of longitudinally spaced cable latches 42 overlie the channel 40 adjacent the ends thereof for retaining the lasher cable 26 in the channel 40 and thus mounting the plate 30 from the cable 26. The under surface of each of the cable latches 42 may be provided with a shallow notch 44 to engage the upper surface of the lasher cable 26. The cable latch 42 extends laterally to the rear of the plate 30 in overlying relation to the upper end of a reinforcing rib 46 with a screw threaded member 48 extending through the latch 42 and the reinforcing rib 46 to removably secure the cable latch 42 in place thereby securing the cable bending device to the lasher cable 26 so that it can move longitudinally thereon and so that it can be rather easily assembled onto the lasher cable 26 and removed therefrom when desired. As illustrated in FIG. 10, the cable latches 44 are attached to the reinforcing ribs 46 adjacent the ends of the plate 30 with the reinforcing ribs 46 extending downward and outwardly in inclined relation to the lower corners of the plate 30 with the ribs 46 reinforcing the plate 30 and the right angular member also reinforcing the plate 30 for purposes of maintaining rigidity.

The front side of the plate 30 includes a pair of end shoes 50 and 52 at opposite ends of the plate 30 and an intermediate shoe 54 with the cable television cable 24 extending above the end shoes 50 and 52 and below the intermediate shoe 54 as illustrated in FIG. 1. The end shoes 50 and 52 are identical but are mirror images to each other with the structurals details of the end shoe 50 being illustrated in FIGS. 2 and 6–8 with the shoe including a curved member 56 having a pair of mounting lugs 58 depending from the edges of one portion thereof with the ends of the curved plate 56 extending beyond the edges of the mounting lugs 58. Each of the mounting lugs 58 includes an enlarged opening 60 of circular configuration which receives correspondingly shaped projections on a rotatable supporting cam 62 that is rotatably journalled on a hollow shaft 64 which extends through the cam 62 and is rigidly affixed to the plate 30 as by welding or the like with the shaft 64 being eccentric with respect to the cylindrical cam 62 so that by rotation of the cam 62 about the eccentric shaft 64, the plate 56 of the shoe 50 will be moved toward and away from the cable 24. The cam 62 is provided with a bore 68 receiving an operating handle 70 therethrough which is secured in place by a set screw 72. Also, the cam 62 is retained on the shaft 64 by a retainer and key 74.

The cam 62 is provided with a locking pin 76 which extends in parallel relation to the shaft 64 but spaced therefrom with the outer end of the locking pin 76 including a knob 78 and the inner end projecting into and engaging one of a series of arcuately spaced holes 80 in the plate 30 in order to lock the cam 62 in rotatively adjusted position. A spring 82 engages a shoulder 84 on the pin 76 to spring bias the inner end of the pin 76 into the hole 80 thereby releasably locking the cam 62 in an adjusted position about the axis defined by the shaft 64.

Attached to the plate 56 is a pad 86 having one or more grooves 88 in its outer surface for receiving one or more cables 24. One end of the plate 56 is provided with a narrow depending lug 90 and the other end of the plate 56 is provided with a depending lug 92 extending across the width thereof and having a spring loaded plunger 94 mounted thereon. The pad 86 includes a backing plate 91 having a pair of fingers or lugs 93 integral with a depending flange 95 thereon to straddle the lug 90. The other end of the backing plate 91 is provided with a flange 96 with an aperture 98 therein receiving the end of the spring loaded plunger thereby removably securing the pad 88 to the plate 56. The structure of the pad 88 and the backing plate 91 is more specifically illustrated in FIG. 7 and this type of pad is used on both of the shoes 50 and 52 and also on the intermediate shoe 54 with the pad on the intermediate shoe 54 being differently shaped and elongated as compared to the pads on the shoes 50 and 52.

The structure of the intermediate shoe 54 is illustrated in more detail in FIGS. 4, 9 and 11 and includes a horizontal top plate 100, an inner plate 102 and an outer plate 104 interconnected by an arcuate bottom plate 106 which corresponds to the plate 56 on the end shoes. As indicated previously, the arcuate bottom plate 106 has a pad mounted thereon which pad is designated by numeral 108 and which is illustrated in detail in FIG. 12 with the pad illustrated therein being the same as the pads on the end shoes except for the curvature thereof. Also, the manner of attaching the pad 108 to the intermediate shoe 54 is the same as that used in attaching the pad 88 to the end shoe 50 or 52. The same reference numerals are used to designate the specific construction of the pads even though their curvature configuration is slightly different.

The plate 30 includes a pair of vertically disposed, longitudinally spaced slots 110 therein which receives a pair of fasteners such as bolts 112 which are connected to the inner wall 102 of the center or intermediate shoe 54 with the fastener including a washer element 114 having a projection 115 slidably engaging the slot 110 in the plate 30 in order to hold the inner wall 102 of the intermediate shoe 54 slidably against the front surface of the plate 30 so that the intermediate shoe 54 will slide on the front surface of the plate 30.

The mechanism for moving the intermediate shoe 54 vertically along the plate 30 is a screw threaded mechanism generally designated by numeral 116 and which includes an elongated screw threaded shaft 118 having a laterally extending handle 120 mounted on the upper end thereof and secured thereto by a securing set screw such as a wing screw 122 or the like with the handle 120 including an upstanding handgrip 124 enabling a person to use his hand 126 to rotate the shaft 118 in either direction to move the intermediate shoe 54 downwardly or upwardly inasmuch as the central portion of the screw threaded shaft 118 is threaded through a nut 128 rigidly affixed to a bracket plate 130 which can pivot about a longitudinal axis parallel to the upper edge of the plate 30 in a manner described hereinafter with the bottom end of the threaded shaft 118 being rotatably and detachably connected to the intermediate shoe 54 in a manner described hereinafter in detail.

The structure for supporting the shaft 118 as well as the bracket plate and nut 128 for pivotal movement includes a pair of lugs 132 rigidly affixed to the rear surface of the plate 30 adjacent the upper edge thereof as illustrated in FIG. 10. A pair of right angular bracket members 134 are pivoted to the lugs by a hinge pin 136. A pair of right angular latches 138 are pivotally supported from the members 134 by a shaft 140 having an axial spring 142 mounted thereon for biasing the latches downwardly so that the projections 144 on the lower ends thereof will latch under the right angular member 38 rigid with the front surface of the plate 30 along the upper edge thereof as illustrated in FIG. 4. The spring 142 biases the latches 138 into engagement with the member 38 about the pivot axis defined by the rod or shaft 140. A projecting tab 146 is connected rigidly with the shaft 140 and thus the latches 138 in order to manually pivot the latches to disengaged relation to the right angular member 38, thereby enabling the plate 130 and nut 128 which is rigid with the right angular members 134 to pivot about the pivot pins 136 thus moving the rotatable shaft 118 to the broken line position illustrated in FIG. 4 or positioning it in operative position as illustrated in full line in FIG. 4.

The lower end portion of the threaded shaft 118 is provided with a shoulder 148 rigid therewith which abuttingly engages the upper surface of the top plate 100 of the intermediate shoe with the projecting lower end 150 of the shaft being movable into and out of a horizontal slot 152 in the top plate 100 and a vertical slot 154 in the front wall 104 of the intermediate shoe as illustrated in FIGS. 4, 9 and 11. This structure enables detachable engagement of the shaft 118 with the intermediate shoe 54. The lower end of the shaft 118 is provided with a peripheral groove 156 which receives and is engaged by a pivotal latch member 158 that is generally an L-shaped member and provided with a manipulating handle portion 160 which extends through a horizontal slot 162 in the front wall 104 of the intermediate shoe 54. An intermediate portion of the latch is pivotally supported by lugs 164 and the inner end of the latch 158 includes a lug 166 which engages the groove 156 to enable rotation of the shaft 118 but to prevent upward movement thereof and also to prevent outward movement thereof until released by the latch 158. A tension spring 168 biases the latch 158 to a latched position so that when the threaded shaft 118 is moved into a vertical position into the slot 152 and through the slot 154, the latch 158 will retain the shaft 118 in a vertical position and cause upward movement of the intermediate shoe when the shaft is rotated in a direction to withdraw the intermediate shoe 54. By manipulating the outer end of the handle 160, the latch 158 may be released thereby enabling the threaded shaft 118 and the associated supporting structure therefor to be pivoted to the broken line position illustrated in FIG. 4 which then enables free sliding movement of the intermediate shoe and also enables disengagement of the bending device from the lasher cable and facilitates movement of the device longitudinally along the lasher cable 26.

The plate 30 and its associated structural components including depending bosses or rounded lower corners 170 and a peripheral reinforcing rib or flange 172 on the rear surface together with the reinforcements 46 on the rear surface and the rigidly affixed shaft 64 on the front surface thereof and the right angular member 38 along the top edge thereof are all rigid attachhments along with the lugs 46 on the rear surface thereof. The end shoes are so constructed that the outer end portions of the pads 88 will first engage the cable television cable 24 at the outer end of the plate 30 where the angular member 38 is bevelled as at 174 and during continued upward movement of the end shoe, the pad 88 will rock and form the shallow downward end curve 176 in the bend or loop 22 in the cable television cable thereby eliiminating sharp bends and resultant stresses in the cable television cable.

In using the invention, the bending device is fitted over the lasher cable and the lasher cable guides or latches 42 at each end of the device are secured in place so that the bending device will not fall off of the lasher cable. The cable television cable 24 is then fitted under the intermediate shoe 54 and over the eccentric shoes or guides at each end. The mechanism for moving the intermediate shoe is then pulled forward and locked in place so that when the handle is turned, the intermediate shoe 54 will bend the cable television cable 24. After the intermediate shoe has been moved downwardly to form the bend or loop 22, the eccentric adjusting and locking assembly for each end shoe is manipulated to force the ends of the cable television cable 24 upwardly to be generally parallel with the rest of the cable thus forming the loop 22 with the bends 176 at each end thereof. After the cable television cable 24 has been secured to the lasher cable 26 at each end of the loop 22 by supporting clips 28, the handle 120 is then rotated to move the intermediate shoe 54 upwardly with the latch 138 being unhooked thus allowing the operating mechanisim for the intermediate shoe to pivot to its open position after actuating the latch member 158 so that the threaded shaft 118 can assume the position illustrated in broken line in FIG. 4. The eccentric adjusting and locking assembly at each end shoe is unlocked and returned to a lowered position with a perfectly formed bend or loop 22 having been formed in the cable. The teflon coated shoe pads are secured by spring loaded pins which allows for interchange of the teflon pads on the shoe thereby enabling a single or multiple cable to be deformed into a shallow bend or loop configuration and also enabling different sizes of cables to be accommodated.

The foregoing is considered as illustrative only of the principles of the invention. Further, since numerous modifications and changes will readily occur to those skilled in the art, it is not desired to limit the invention to the exact construction and described, and accordingly, all suitable modifications and equivalents may be resorted to, falling within the scope of the invention.

What is claimed as new is as follows:

1. A cable bending device for forming a shallow partial loop in a cable television cable or the like comprising an elongated support member positionable alongside of a cable television cable to be bent, a pair of longitudinally spaced members mounted on the support member and engageable with the cable television cable at longitudinally spaced points on one side of the cable, an intermediate member mounted on said support member and positionable to engage the cable television cable on the side thereof opposite to the longitudinally spaced members at a point intermediate the points of engagement between the longitudinally spaced members and the cable television cable, means interconnecting the intermediate member and the support member to move the intermediate member toward the cable television cable to deform the cable television cable laterally into a partial loop to enable contraction and expansion of the cable television cable during temperature changes, and means interconnecting the longitudinally spaced members and the support member to independently move each of the longitudinally spaced members laterally toward the intermediate member to complete the deformation of the cable television cable to form a partial loop therein.

2. The structure as defined in claim 1 together with means on said support member for engagement with a supporting lasher cable with the support member being generally vertically disposed in depending relation to the lasher cable so that the television cable can be secured to the lasher cable at each end portion of the partial loop formed therein after the loop has been formed.

3. The structure as defined in claim 2 wherein each of the longitudinally spaced members includes an upwardly facing cable engaging shoe having a pad thereon with a groove receiving the television cable, said intermediate member including a shoe with a pad thereon having a groove receiving the television cable with the curvature of the shoes and pads cooperating to form a shallow partial loop in the cable television cable without forming sharp bends therein.

4. The structure as defined in claim 3 wherein said support member is in the form of a vertical plate with the shoes being mounted on one surface thereof, said means securing the support member to the lasher cable including an elongated upwardly opening channel along the upper edge of the plate with the channel receiving the lasher cable, and latch means secured to the upper edge of the plate and overlying the channel to retain the lasher cable therein.

5. The structure as defined in claim 4 wherein said intermediate member is slidably supported on said vertical plate, said vertical plate including a pair of vertically disposed, parallel slots therein, said intermediate shoe including an inner plate slidable against the vertical plate with fasteners extending through the slots and engaged with the inner plate on the intermediate shoe thereby guiding the vertical movement of the intermediate shoe in relation to the vertical plate.

6. The structure as defined in claim 5 wherein said means for moving the intermediate member includes a vertically disposed threaded shaft having a crank handle at the upper end thereof and the lower end being rotatably connected to the intermediate shoe in a manner to move the shoe vertically in a selected direction depending upon the rotational direction of the threaded shaft.

7. The structure as defined in claim 6 wherein said means to move the longitudinally spaced members includes a supporting shaft member rigid with the plate projecting laterally therefrom, a cam mounted on said shaft in eccentric relation with the cam including projecting bosses, each end shoe including openings eccentric with respect to the rotational axis of the cam members for receiving the projections on the cam members whereby rotation of the cam members will move the shoes and pads thereon upwardly with the curvature of the shoes and pads serving to form part of the cable television cable parallel with the main portion of the cable thereby producing a partial loop with the end portions having shallow curves and portions forming a continuation of the main part of the cable television cable.

8. The structure as defined in claim 7 together with means mounting the threaded shaft on the vertical plate for pivotal movement about an axis parallel to the upper edge of the plate, means detachably connecting the lower end of the threaded shaft to the intermediate shoe to enable the threaded shaft to be disconnected from the intermediate shoe and pivoted about a longitudinal axis at the upper edge of the plate to an inoperative out-of-the-way position to enable the intermediate shoe to be moved manually into a position for engagement by the threaded shaft whereby rotation of the threaded shaft then will cause deformation of the cable television cable.

9. The structure as defined in claim 8 wherein each shoe pad is constructed of wear resistant, plastic material to protect the cable television cable from damage, and means detachably connecting the pad to the shoe to enable interchangeability of the pads to accommodate various sizes and numbers of cable television cables.

10. A bending device comprising an elongated plate, an elongated member to be formed into a shallow bend positioned longitudinally along one surface of the plate, a pair of end shoes mounted on the plate and engaging one side of the member to be deformed, an intermediate shoe mounted on the plate between the end shoes and engaging the member to be bent on the opposite side thereof from the end shoes, each of the end shoes and the intermediate shoe including a curved pad engaged with the member to be bent, means interconnecting the plate and intermediate shoe to move the intermediate shoe laterally between the end shoes to deform the member to be bent into a shallow loop, and means interconnecting the plate and each of the end shoes for independently moving the end shoes laterally toward the ends of the intermediate shoe to complete the formation of the shallow bend in the member to be bent.

11. The structure as defined in claim 10 wherein the member to be bent is a cable strung from a supporting lasher cable, said plate including means to removably support the plate from the lasher cable to form the shallow bend in the strung cable in place adjacent the lasher cable thereby enabling the strung cable to be suspended from the lasher cable by clip means after the shallow bend has been formed.

12. The structure as defined in claim 11 whereon said means to move the intermediate shoe includes a manually operated screw threaded shaft having an end portion rotatably connected to the intermediate shoe and a threaded portion threadedly engaged with the plate, said means to independently move the end shoes including a manually rotated cam journalled on the plate and engaged with an end shoe.

13. The structure as defined in claim 10 wherein said means interconnecting the plate and each of the end shoes for independently moving the end shoes laterally includes a cam rotatably mounted from the plate, handle means connected with the cam for manual rotation thereof, said end shoe including means supportingly engaged with said cam for movement of the shoe laterally when the cam is rotated.

14. The structure as defined in claim 13 wherein said plate includes a clamping surface disposed in opposed relation to each of the end shoes for clamping engagement with the member to be bent when the end shoes are moved toward the clamping surface by rotation of the cams, each end shoe being arcuately curved with the inner portion of each end shoe curving downwardly away from the clamping surface and generally forming a continuation of the surface of the intermediate shoe engaging the member to be bent to form a shallow curve at each end of the bend formed in the member to be bent.

15. In a cable bending device for forming a shallow partial loop in a cable television cable suspended from a supporting lasher cable comprising an elongated support member positionable along the cable to be bent, a pair of longitudinally spaced end members mounted on the support member and engageable with the cable at longitudinally spaced points on one side thereof, an intermediate member mounted on the support member for engaging the cable on the side thereof opposite to the end members at a point intermediate the points of engagement between the end members and the cable, means interconnecting the intermediate member and the support member to move the intermediate member toward the cable to deform the cable laterally into a partial loop to enable contraction and expansion of the cable during temperature changes, the improvement comprising said support member being in the form of a vertical plate having lateral flange means along the upper edge portion thereof in opposed relation to the end members for supporting engagement with the supporting lasher cable, each of said end members including a curved shoe for engaging the cable to be bent in opposed relation to the the intermediate member, means supporting the end members from said plate for independently moving the end members laterally toward and away from the the intermediate member for clamping engaging the cable to be bent between the curved shoes and the intermediate member to enable the cable to be bent and the lasher cable to be secured together in adjacent relation when the loop has been formed in the cable to be bent.

16. The cable bending device as defined in claim 15 wherein said improvement also comprises said means to move the intermediate toward the cable to be bent including a screw threaded shaft having a lower end engaged with the intermediate member, means screw threadedly supporting the threaded shaft from said vertical plate adjacent the upper edge thereof to enable manual rotation of the screw threaded shaft to raise and lower the intermediate member, said means supporting the rotatable threaded shaft from the plate including means enabling the screw threaded shaft to pivot about an axis generally parallel to the upper edge of the plate to enable the shaft to be pivoted to an out-of-the-way position thereby enabling vertical movement of the intermediate member in relation to the plate independent of the shaft.

17. The cable bending device as defined in claim 16 wherein said improvement also comprises said means supporting the end members from said plate for independently moving the end members laterally including cams rotatably supported on the plate with each cam supporting an end member and shoe, each cam including handle means for manually rotating the cam, and a lock for each rotatable cam to secure the cams in position with the cable to be bent between the under surface of the flange means and the shoes on the end members supported from the cams, said intermediate member including slot means enabling entry and exit of the lower end of the rotatable shaft, latch means releasably securing the lower end of the rotatable shaft in the slot means in the intermediate member to enable disengagement of the lower end of the shaft from the intermediate member when the shaft is pivoted to an out-of-the-way position.

18. The cable bending device as defined in claim 17 wherein said improvement also includes means overlying the flange means and clampingly engaging the supporting lasher cable to secure the supporting lasher cable to the flange means on the upper edge portion of the plate when the rotatable shaft and supporting structure therefore are pivoted to the out-of-the-way position to enable the flange means to be engaged with the lasher cable, said vertical plate enabling the cable to be bent to be laterally received under the intermediate member and above the end members with the vertical plate limiting movement of the cable to be bent to provide automatic alignment of the intermediate member and the end members with the cable to be bent.

* * * * *